(12) United States Patent
Li et al.

(10) Patent No.: US 8,913,077 B2
(45) Date of Patent: Dec. 16, 2014

(54) IMAGE PROCESSING APPARATUS AND IMAGE PROCESSING METHOD

(75) Inventors: Yu-Hung Li, Taoyuan County (TW); Chien-Hung Chen, New Taipei (TW)

(73) Assignee: Chunghwa Picture Tubee, Ltd., Taoyuan County (TW)

( * ) Notice: Subject to any disclaimer, the term of this patent is extended or adjusted under 35 U.S.C. 154(b) by 357 days.

(21) Appl. No.: 13/421,875

(22) Filed: Mar. 16, 2012

(65) Prior Publication Data

US 2013/0176314 A1    Jul. 11, 2013

(30) Foreign Application Priority Data

Jan. 11, 2012   (TW) .............................. 101101080 A

(51) Int. Cl.
| | | |
|---|---|---|
| G09G 5/00 | (2006.01) | |
| G09G 5/02 | (2006.01) | |
| H04N 9/64 | (2006.01) | |
| H04N 9/12 | (2006.01) | |
| H04N 1/405 | (2006.01) | |
| H04N 1/46 | (2006.01) | |
| H04N 1/40 | (2006.01) | |
| G06K 9/00 | (2006.01) | |
| H04N 13/04 | (2006.01) | |
| G06T 15/60 | (2006.01) | |

(52) U.S. Cl.
CPC ............ *G06T 15/60* (2013.01); *H04N 13/0452* (2013.01)
USPC ........... 345/596; 345/600; 345/606; 345/644; 345/690; 348/571; 348/739; 358/3.14; 358/525; 358/535; 358/448; 382/154

(58) Field of Classification Search
USPC ........ 345/3.2, 3.3, 6, 42, 581, 589, 600, 606, 345/643–644, 596, 690; 348/477–479, 513, 348/521, 524, 529–531, 571, 669, 702, 705, 348/739; 358/3.13, 3.14, 525, 533–535, 358/448; 382/237, 247, 254, 276, 154; 375/240.01, 240.03, 254

See application file for complete search history.

(56) References Cited

U.S. PATENT DOCUMENTS

| | | | |
|---|---|---|---|
| 5,210,615 A | 5/1993 | Kwon | |
| 6,469,708 B1 | 10/2002 | Wu et al. | |
| 6,573,928 B1 * | 6/2003 | Jones et al. | 348/51 |
| 7,027,061 B1 * | 4/2006 | Dotson et al. | 345/545 |
| 7,088,370 B1 * | 8/2006 | Dotson et al. | 345/546 |
| 2003/0117489 A1 * | 6/2003 | Jones et al. | 348/51 |
| 2005/0024381 A1 * | 2/2005 | Dotson et al. | 345/600 |
| 2011/0169831 A1 * | 7/2011 | Kao et al. | 345/426 |

FOREIGN PATENT DOCUMENTS

| | | |
|---|---|---|
| TW | 1280044 | 4/2007 |
| TW | 201011682 | 3/2010 |

* cited by examiner

*Primary Examiner* — Wesner Sajous
(74) *Attorney, Agent, or Firm* — Jianq Chyun IP Office

(57) ABSTRACT

An image processing apparatus and an image processing method are provided. When a display apparatus is in the 3D display mode, a mode-switching unit adjusts the way to generate a vertical-count-value by counting every two rows of pixels and outputs the adjusted vertical-count-value. A dither unit outputs a carry value corresponding to the adjusted vertical-count-value. An adding unit adds the carry value and the surplus pixel bit together.

11 Claims, 4 Drawing Sheets

IMAGE PROCESSING APPARATUS AND IMAGE PROCESSING METHOD

CROSS-REFERENCE TO RELATED APPLICATION

This application claims the priority benefit of Taiwan application serial no. 101101080, filed on Jan. 11, 2012. The entirety of the above-mentioned patent application is hereby incorporated by reference herein and made a part of this specification.

BACKGROUND OF THE INVENTION

1. Field of the Invention

The invention relates to an image processing apparatus and an image processing method. More particularly, the invention relates to an image processing apparatus for adjusting a gray level of a pixel block of a display apparatus and an image processing method for adjusting a gray level of a pixel block of a display apparatus.

2. Description of Related Art

The three-dimensional (3D) display technique is the mainstream in this digital display era. When the 3D display technique is applied to the entertainment field, the field of medical research, or other fields, users are allowed to feel as if they were present. In terms of entertainment, when users watch 3D movies or play 3D videogames, the 3D display technique may create the visual effect on an object as to fly toward the users and pop out from the screen, so as to give the users the feeling of being there. As such, the 3D display technique indeed leads to development of movie and gaming industry.

At present, the 3D display technique may be roughly categorized into two types. One is the stereoscopic type which requires a viewer to wear specially designed glasses, and the other is the auto-stereoscopic type which allows the viewer to watch images or videos directly with naked eyes. According to the operational principle of an auto-stereoscopic display apparatus, a fixed barrier is utilized to control images received by left and right eyes of the viewer. However, according to visual characteristics of human eyes, when two images with the same content but different parallax are respectively captured by a viewer's left and right eyes, two images that seem to be overlapped may be interpreted as a 3D image. Besides, according to the operational principle of a stereoscopic stereo display apparatus, the display apparatus displays left-eye and right-eye images that can be respectively sent to the left and right eyes of the viewer who wears glasses, so as to generate a 3D image.

In the conventional dither algorithm for a 6-bit source driver controlling a thin film transistor liquid crystal display (TFT-LCD) panel, an 8-bit to 6-bit resolution dither function is provided. Particularly, the dither function applies a concept of averages to accomplish a four-time resolution refinement of an image. For instance, the dither function manages to mimic 256 colors (supposed to be synthesized to 8 bits of memory) with only 6 bits of memory. Besides, a 4×4 pixel block for four frames is arranged in a normal dither matrix. Please refer to FIG. 1A schematically illustrating arrangement of a dither matrix in a two-dimensional (2D) display. As shown in FIG. 1A, such arrangement of the dither matrix is sufficiently applicable to the 2D display and allows the 2D display to display images with high quality.

Nonetheless, when the conventional arrangement of the dither matrix applicable to the 2D display is applied to a 3D display, image flickers or apparent patterns occur. In an exemplary polarizing 3D display technique, pixels of a 3D display in odd rows and even rows separately present a left-eye image and a right-eye image, and a pair of polarizing glasses allows the left and right eyes to respectively receive the corresponding images. Thereby, the arrangements of the dither matrix respectively corresponding to the left-eye image and the right-eye image are shown in FIG. 1B. Namely, FIG. 1B schematically illustrates the conventional arrangements of a dither matrix respectively corresponding to the left and right eyes even when a 3D display mode is activated. It can be observed from FIG. 1B that the arrangements of a dither matrix corresponding to the left and right eyes differ from each other, thus resulting in image flickers or apparent patterns and significantly reducing the 3D image quality.

SUMMARY OF THE INVENTION

The invention is directed to an image processing apparatus and an image processing method for arranging a dither matrix applicable to a 2D display mode even though a 3D display mode is activated, and image flickers or apparent patterns can also be precluded.

In the invention, an image processing method for adjusting a gray level of a pixel block of a display apparatus is provided. Here, an image is displayed on the pixel block by switching a plurality of frames, and the image processing method includes following steps: acquiring the least significant bit (LSB) and a surplus pixel bit from each pixel of the pixel block; determining whether the display apparatus is in a 3D display mode or in a 2D display mode according to a mode-switching signal; if the display apparatus is in the 3D display mode, adjusting the way to generate a vertical-count-value by counting every two rows of pixels, wherein the LSB indicates a dither matrix group corresponding to the pixel block, and the vertical-count-value indicates a carry value of the dither matrix group corresponding to each row of pixels of the pixel block; outputting the carry value corresponding to the vertical-count-value; adding the carry value of the dither matrix group corresponding to the vertical-count-value to the surplus pixel bit corresponding to vertical-count-value.

In the invention, an image processing apparatus for adjusting a gray level of a pixel block of a display apparatus is provided. Here, an image is displayed on the pixel block by switching a plurality of frames. The image processing apparatus includes a pixel block processing unit, a counting unit, a mode-switching unit, a dither unit, and an adding unit. The pixel block processing unit acquires the least significant bit (LSB) and a surplus pixel bit from each pixel of a pixel block. The counting unit generates a vertical-count-value according to the pixel block. The mode-switching unit is coupled to the counting unit and determines whether the display apparatus is in a 3D display mode or in a 2D display mode according to a mode-switching signal. When the display apparatus is in the 3D display mode, the mode-switching unit adjusts the way to generate the vertical-count-value by counting every two rows of pixels, and the mode-switching unit outputs the adjusted vertical-count-value. The LSB indicates a dither matrix group corresponding to the pixel block, and the vertical-count-value indicates a carry value of the dither matrix group corresponding to each row of pixels of the pixel block. The dither unit is coupled to the pixel block processing unit, the counting unit, and the mode-switching unit, and the dither unit outputs a carry value corresponding to the adjusted vertical-count-value according to the adjusted vertical-count-value. The adding unit is coupled to the pixel block processing unit and the dither unit, and the adding unit adds the carry value of the dither matrix group corresponding to the vertical-count-value to the surplus pixel bit corresponding to vertical-count-value.

According to an embodiment of the invention, the counting unit further generates a horizontal-count-value and a frame-count-value according to the pixel block, and the dither unit further outputs the carry value of the dither matrix group corresponding to each pixel according to the horizontal-count-value and the frame-count-value. The horizontal-count-value indicates the carry value of the dither matrix group corresponding to each column of pixels of the pixel block, and the frame-count-value indicates a dither matrix of the dither matrix group corresponding to the pixel block.

According to an embodiment of the invention, the vertical-count-value is generated by counting each row of pixels if the display apparatus is in the 2D display mode.

According to an embodiment of the invention, the frames include a first frame, a second frame, a third frame, and a fourth frame, and the frames start to be sequentially switched from one of the first, second, third, and fourth frames.

According to an embodiment of the invention, the frames start to be sequentially switched from the first frame, and the way to carry each pixel of the pixel block in a (4N+1) frame of the frames is identical to the way to carry each pixel of the pixel block in the first frame. The way to carry each pixel of the pixel block in a (4N+2) frame of the frames is identical to the way to carry each pixel of the pixel block in the second frame. The way to carry each pixel of the pixel block in a (4N+3) frame of the frames is identical to the way to carry each pixel of the pixel block in the third frame. The way to carry each pixel of the pixel block in a (4N+4) frame of the frames is identical to the way to carry each pixel of the pixel block in the fourth frame. Here, N is a positive integer.

According to an embodiment of the invention, the mode-switching unit includes a shift register and a multiplexer. The shift register is coupled to the counting unit and divides the vertical-count-value by two. A first input end and a second input end of the multiplexer are coupled to the counting unit and the shift register, respectively. The selecting end of the multiplexer receives the mode-switching signal, and the selecting end selects to output the vertical-count-value or the vertical-count-value divided by two according to the mode-switching signal.

Based on the above, in the image processing apparatus and the image processing method of the invention, the vertical-count-value is generated by counting every two rows of pixels if the display apparatus is in the 3D display mode. Thereby, the issue of image flickers or apparent patterns arisen from different arrangements of a dither matrix respectively corresponding to the left and right eyes in the 2D display mode can be resolved. What is more, the image processing apparatus and the image processing method described herein are applicable to display panels with various dimensions in no need of expanding the memory capacity.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

Figures 1A, 1B:
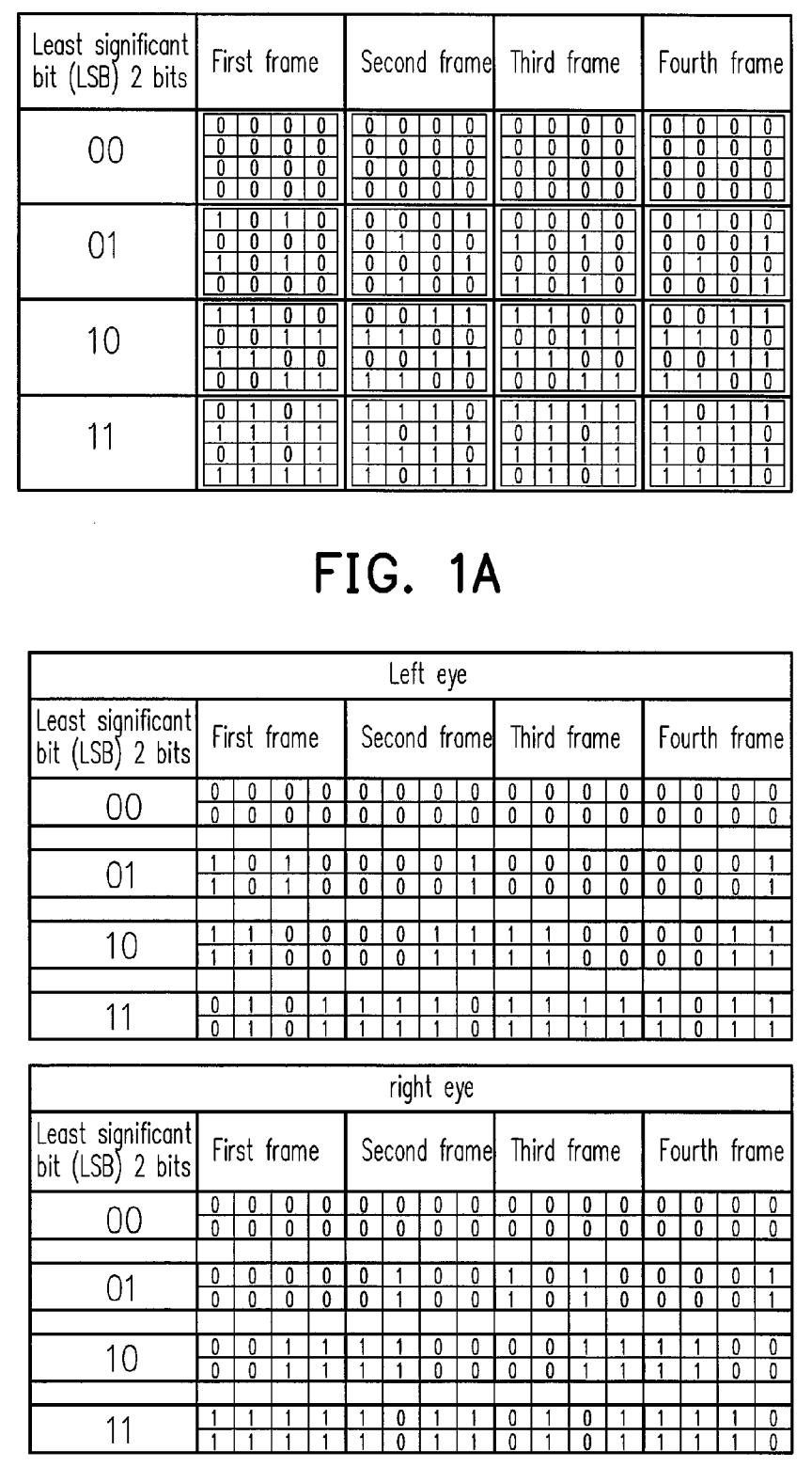

FIG. 1A schematically illustrates arrangement of a dither matrix in a 2D display.

FIG. 1B schematically illustrates the conventional arrangements of a dither matrix respectively corresponding to the left and right eyes in a 3D display mode.

FIG. 4 schematically illustrates arrangements of a dither matrix respectively corresponding to the left and right eyes in a 3D display mode according to an embodiment of the invention.

DESCRIPTION OF EMBODIMENTS

In the following embodiments, an image processing apparatus and an image processing method are provided, wherein the vertical-count-value is generated by counting every two rows of pixels if a 3D display mode is activated. Thereby, the issue of image flickers or apparent patterns arisen from different arrangements of a dither matrix corresponding to the left and right eyes in the 2D display mode can be resolved.

In order to make the invention more comprehensible, embodiments are described below as the examples to prove that the invention can actually be realized.

Figures 2, 3:
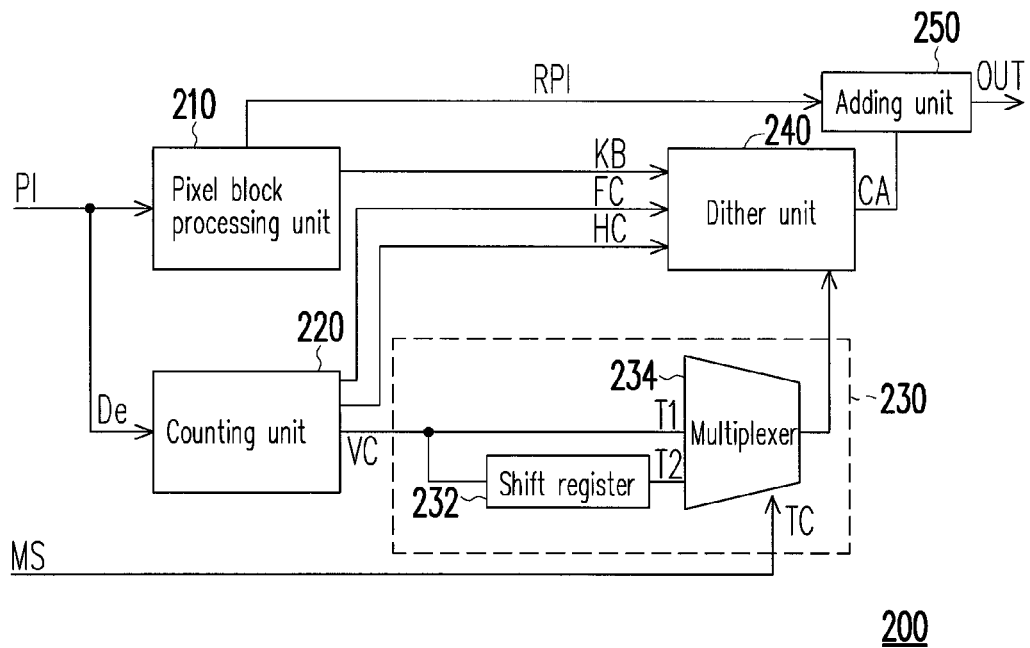
FIG. 2 schematically illustrates an image processing apparatus according to an embodiment of the invention.
FIG. 3 schematically illustrates arrangement of a dither matrix according to an embodiment of the invention.

Please refer to FIG. 2 which schematically illustrates an image processing apparatus according to an embodiment of the invention. According to the embodiment, the image processing apparatus 200 is adapted for adjusting a gray level of a pixel block of a display apparatus (not shown). Besides, in an embodiment of the invention, an image is displayed on the pixel block of the display apparatus by switching a plurality of frames. For instance, one 8-bit image frame data may be displayed by four 6-bit image frame data, such that the display effects of 256 colors (supposed to be synthesized to 8 bits of memory) may be mimicked with only 6 bits of memory (64 colors).

The image processing apparatus 200 of the present embodiment includes a pixel block processing unit 210, a counting unit 220, a mode-switching unit 230, a dither unit 240, and an adding unit 250. The pixel block processing unit 210 acquires the least significant bit (LSB) KB and a surplus pixel bit RPI from each pixel PI of a pixel block. The mode-switching unit 230 is coupled to the counting unit 220 for determining whether a display apparatus is in a 3D display mode or a 2D display mode according to a mode-switching signal MS. The dither unit 240 is coupled to the pixel block processing unit 210, the counting unit 220, and the mode-switching unit 230 for outputting a corresponding carry value CA to the adding unit 250 according to the LSB KB, a frame-count-value FC, a horizontal-count-value HC, and a vertical-count-value VC. The adding unit 250 is coupled to the pixel block processing unit 210 and the dither unit 240 for adding the carry value CA and the surplus pixel bit RPI together and outputting a display data bit OUT according to the result of addition. Thereby, a next-level driver IC may drive the display apparatus to display an image.

FIG. 3 schematically illustrates arrangement of a dither matrix according to an embodiment of the invention. With reference to FIG. 2 and FIG. 3, in the present embodiment, 16 dither matrixes arranged in the dither unit 240 are divided into four groups according to the LSB KB (e.g., 00, 01, 10, and 11); namely, the LSB KB indicates the dither matrix group corresponding to each pixel PI of the pixel block. Each of the dither matrix groups includes four dither matrixes, different dither matrixes correspond to different frames (the first frame~the fourth frame), and each of the dither matrixes is a 4×4 pixel block (both the horizontal-index-value and the vertical-index-value are from 0~3). The frames start to be sequentially switched from one of the first, second, third, and fourth frames.

That is to say, the way to carry each pixel PI of the pixel block in a (4N+1) frame is identical to the way to carry each pixel PI of the pixel block in the first frame, the way to carry each pixel PI of the pixel block in a (4N+2) frame is identical to the way to carry each pixel PI of the pixel block in the second frame, the way to carry each pixel PI of the pixel block in a (4N+3) frame is identical to the way to carry each pixel PI of the pixel block in the third frame, and the way to carry each pixel PI of the pixel block in a (4N+4) frame is identical to the way to carry each pixel PI of the pixel block in the fourth frame. Here, N is a positive integer.

Detailed steps are provided in the following embodiment of the invention. The pixel block processing unit 210 acquires the LSB KB and the surplus pixel bit RPI from each pixel PI of the pixel block in the sequentially received image frame data. The LSB KB and the surplus pixel bit RPI are respectively transmitted to the dither unit 240 and the adding unit 250. Note that each pixel PI of the pixel block carries one data enabling signal De that is transmitted to the counting unit 220, so as to enable the counting unit 220 to generate a count value.

In particular, the counting unit 220 generates the horizontal-count-value HC and the vertical-count-value VC according to the data enabling signal De received by the counting unit 220, and the counting unit 220 respectively transmits the horizontal-count-value HC and the vertical-count-value VC to the dither unit 240 and the mode-switching unit 230, such that the dither unit 240 is able to learn relevant position information of the currently-being-processed pixel PI. The counting unit 220 further generates a frame-count-value FC according to the number of frames of the currently-being-processed pixel PI and transmits the frame-count-value FC to the dither unit 240. The horizontal-count-value HC indicates the carry value of the dither matrix group corresponding to each column of pixels of the pixel block. The vertical-count-value VC indicates the carry value of the dither matrix group corresponding to each row of pixels of the pixel block. The frame-count-value FC indicates the dither matrix of the dither matrix group corresponding to the pixel block.

The mode-switching unit 230 determines whether the display apparatus is in the 3D display mode or in the 2D display mode according to the mode-switching signal MS received by the mode-switching unit 230. If the display apparatus is in the 2D display mode, the mode-switching unit 230 directly outputs the vertical-count-value VC counted by the counting unit 220 and transmits the vertical-count-value VC to the dither unit 240. Here, the counting unit 220 generates the vertical-count-value VC by counting each row of pixels. The dither unit 240 then finds the corresponding dither matrix group based on the LSB KB and finds the corresponding dither matrix based on the frame-count-value FC. According to the horizontal-count-value HC and the vertical-count-value VC, the dither unit 240 finds the corresponding carry value CA of the dither matrix and transmits the same to the adding unit 250. The adding unit 250 adds the carry value CA and the surplus pixel bit RPI together and outputs the display data bit OUT.

If the display apparatus is in the 3D display mode, the mode-switching unit 230 adjusts the way to generate the vertical-count-value VC (transmitted from the counting unit 220) by counting every two rows of pixels, and the mode-switching unit 230 outputs the adjusted vertical-count-value VC to the dither unit 240. According to the LSB KB, the frame-count-value FC, the horizontal-count-value HC, and the vertical-count-value VC, the dither unit 240 finds the arrangement of the dither matrix shown in FIG. 3, so as to acquire the corresponding carry value CA. The carry value CA is output to the adding unit 250, such that the adding unit 250 adds the carry value CA and the surplus pixel bit RPI together and then outputs the display data bit OUT. Following descriptions are related to the visual effects accomplished by the arrangement of the dither matrix after the 3D display mode is activated.

Figure 4:
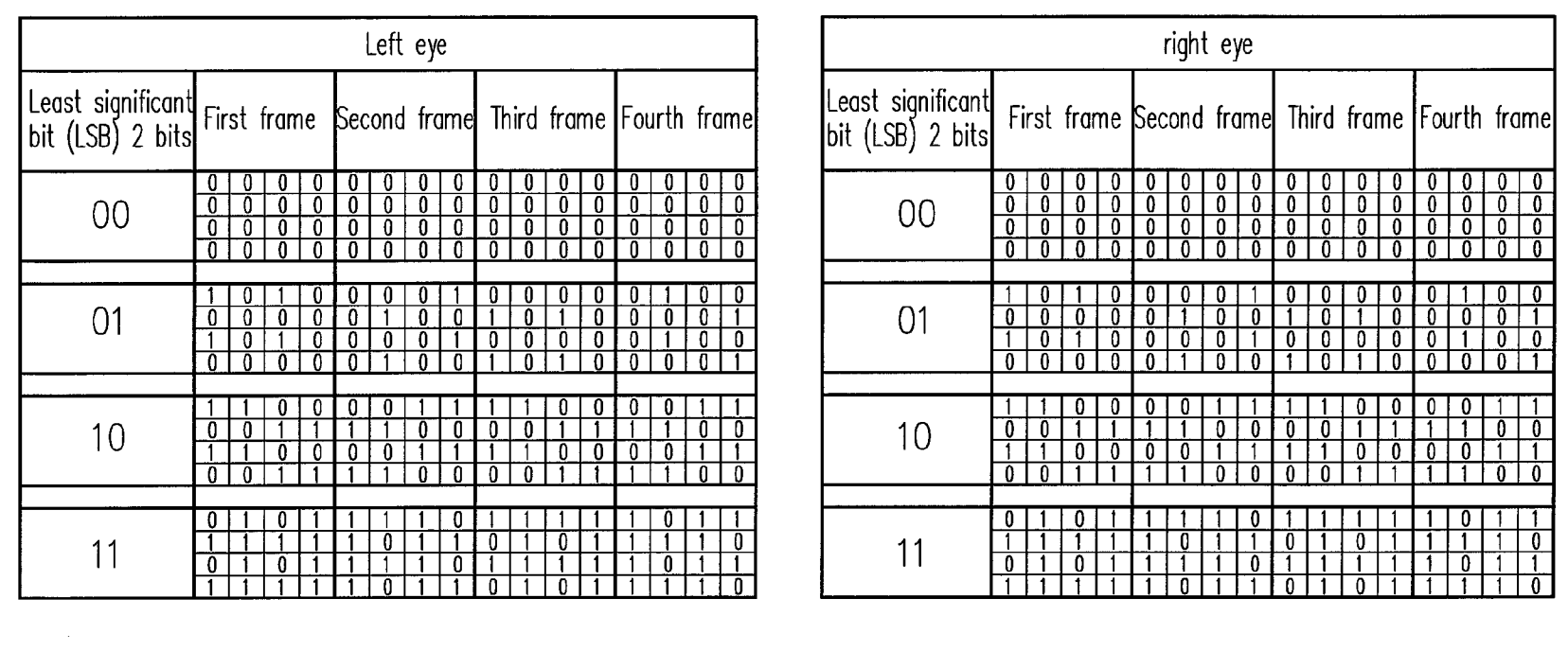

Please refer to FIG. 4 which schematically illustrates arrangements of a dithering matrix corresponding to the left and right eyes in a 3D display mode according to an embodiment of the invention. Based on the display principle of stereo images, the left eye and the right eye of a viewer need be at different viewing angles to generate parallax; besides, the brightness of light received by the left eye of the viewer cannot be significantly differ from the brightness of light received by the right eye of the viewer, so as not to cause image flickers or apparent patterns. It can be learned from FIG. 4 that the arrangements of the dither matrix respectively corresponding to the left and right eyes stay the same if the way to count the vertical-count-value VC is adjusted. Thereby, the issue of image flickers or apparent patterns arisen from different arrangements of the dither matrix respectively corresponding to the left and right eyes can be resolved. Besides, the arrangement of the dither matrix applied to the display apparatus in the 2D display mode is the same as the arrangement of the dither matrix applied to the display apparatus in the 3D display mode. Hence, it is not necessary to expand the memory capacity.

With reference to FIG. 2, to be specific, the mode-switching unit 230 may include a shift register 232 and a multiplexer 234. Here, the shift register 232 is coupled to the counting unit 220 for dividing the vertical-count-value VC by two. This is similar to adjustment of the way to generate the vertical-count-value VC by counting every two rows of pixels. Besides, the input ends T1 and T2 of the multiplexer 234 are respectively coupled to the counting unit 220 and the shift register 232 for respectively receiving the vertical-count-value VC or the vertical-count-value VC divided by two (i.e., the adjusted vertical-count-value VC). The selecting end TC of the multiplexer 234 receives the mode-switching signal MS, and the selecting end TC selects to output the vertical-count-value VC or the vertical-count-value VC divided by two according to the mode-switching signal MS. For instance, if the mode-switching signal MS indicates the 2D display mode, the output end of the multiplexer 234 outputs the vertical-count-value VC to the dither unit 240. By contrast, if the mode-switching signal MS indicates the 3D display mode, the output end of the multiplexer 234 outputs the vertical-count-value VC divided by two to the dither unit 240. It should be mentioned that the mode-switching unit 230 of the present embodiment is merely exemplary and should not be construed as a limitation to the invention.

The above-mentioned embodiments are further elaborated hereinafter. As indicated in FIG. 2, given that the display apparatus is in the 2D display mode according to the mode-switching signal MS, and the pixel block processing unit 210 receives a pixel PI with the LSB KB (01), the pixel block processing unit 210 acquires the LSB KB (01) and the surplus pixel bit RPI (6 bits) from the pixel PI and transmits the LSB KB (01) and the surplus pixel bit RPI (6 bits) to the dither unit 240 and the adding unit 250, respectively.

The pixel PI brings a data enabling signal De to the counting unit 220, and thereby the counting unit 220 generates the horizontal-count-value HC and the vertical-count-value VC.

For instance, when the counting unit 220 respectively transmits the horizontal-count-value HC (assumed to be 3) and the vertical-count-value VC (assumed to be 1) to the dither unit 240 and the mode-switching unit 230 (i.e., to the multiplexer 232 and the shift register 234), the vertical-count-value VC (equivalent to 3) of the input end T1 is directly transmitted to the dither unit 240 because the mode-switching signal MS received by the selecting end TC of the multiplexer 234 indicates the 2D display mode. The dither unit 240 then finds the corresponding carry value according to the vertical-count-value VC (equivalent to 1), the horizontal-count-value HC (equivalent to 3), and the frame-count-value FC (e.g., equivalent to 2).

Please refer to FIG. 2 and FIG. 3 together. The dither unit 240 finds the corresponding dither matrix group based on the LSB KB (01), finds the corresponding dither matrix based on the frame-count-value FC (equivalent to 2), and finds the corresponding carry value CA of the dither matrix according to the horizontal-count-value HC (equivalent to 3) and the vertical-count-value VC (equivalent to 1) of the matrix. As indicated in FIG. 3, the carry value CA is zero. The dither unit 240 then transmits the carry value CA (equivalent to zero) to the adding unit 250, such that the adding unit 250 adds the carry value CA and the surplus pixel bit RPI together and then outputs the display data bit OUT according to the result of addition.

Please refer to FIG. 2 and FIG. 3. The image processing method is further exemplified below, given that the display apparatus is in the 3D display mode. If the pixel block processing unit 210 receives a pixel PI with the LSB KB (11), the pixel block processing unit 210 acquires the LSB KB (11) and the surplus pixel bit RPI (6 bits) from the pixel PI and transmits the LSB KB (11) and the surplus pixel bit RPI (6 bits) to the dither unit 240 and the adding unit 250, respectively.

The pixel PI brings a data enabling signal De to the counting unit 220, and thereby the counting unit 220 generates the horizontal-count-value HC and the vertical-count-value VC. For instance, when the counting unit 220 respectively transmits the horizontal-count-value HC (assumed to be 3) and the vertical-count-value VC (assumed to be 1) to the dither unit 240 and the mode-switching unit 230 (i.e., to the multiplexer 234 and the shift register 232), the vertical-count-value VC of the input end T1 of the multiplexer 234 is 1, and the vertical-count-value VC (equivalent to zero) of the input end T2 of the multiplexer 234 is divided by two by the shift register 232. Since the mode-switching signal MS received by the selecting end TC of the multiplexer 234 indicates the 3D display mode, the vertical-count-value VC (equivalent to zero) of the input end T2 of the multiplexer 234 is output to the dither unit 240. The dither unit 240 then finds the corresponding carry value according to the vertical-count-value VC (equivalent to zero), the horizontal-count-value HC (equivalent to 3), and the frame-count-value FC (e.g., equivalent to 2).

With reference to FIG. 2 and FIG. 3, the dither unit 240 finds the corresponding dither matrix group based on the LSB KB (11) and then finds the corresponding dither matrix based on the frame-count-value FC (equivalent to 2) of the matrix. After that, the dither unit 240 finds the corresponding carry value CA of the dither matrix according to the horizontal-count-value HC (equivalent to 3) and the vertical-count-value VC (equivalent to 0) of the matrix. As indicated in FIG. 3, the carry value CA is zero.

According to visual characteristics of human eyes, when two images with the same content but different parallax are respectively captured by a viewer's left and right eyes, two images that seem to be overlapped may be interpreted as a 3D image by the human eyes. Hence, the left eye and the right eye of a viewer need be at different viewing angles to generate parallax; besides, the brightness of light received by the left eye of the viewer cannot be significantly differ from the brightness of light received by the right eye of the viewer, so as not to cause image flickers or apparent patterns. In the present embodiment, the shift register 232 is utilized to divide the vertical-count-value VC by two; thereby, as long as the images transmitted to the left and right eyes are switched from the left eye to the right eye or from the right eye to the left eye, the vertical-count-value VC is counted.

It can be learned from FIG. 4 that the arrangements of the dither matrix corresponding to the left and right eyes stay the same if the way to count the vertical-count-value VC is adjusted. As such, the issue of image flickers or apparent patterns arisen from different arrangements of the dither matrix corresponding to the left and right eyes can be resolved even though the arrangement of the dither matrix is applicable to the display apparatus in the 2D display mode. Moreover, it is not necessary to expand the memory capacity.

Figure 5:
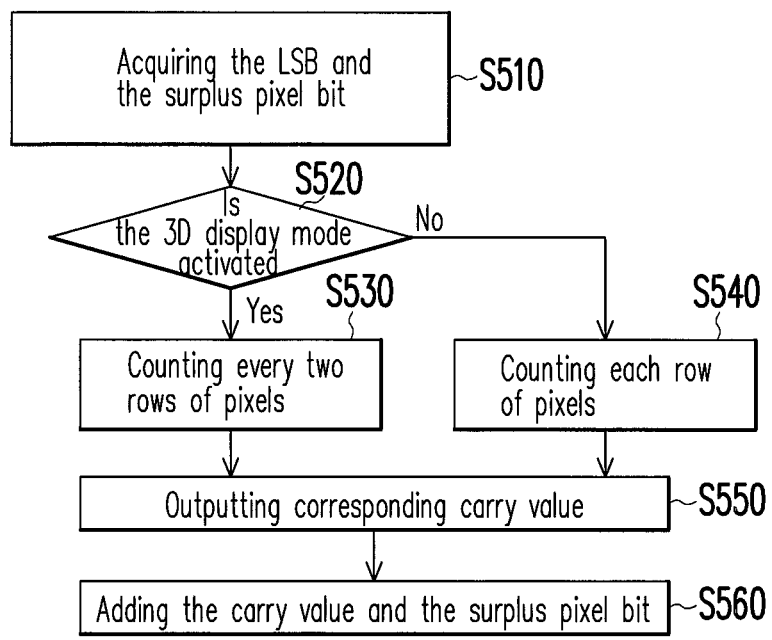
FIG. 5 is a flowchart of an image processing method according to an embodiment of the invention.

An image processing method is then derived from the previous embodiments with respect to the image processing apparatus. Please refer to FIG. 5 which is a flowchart of an image processing method according to an embodiment of the invention. The image processing may include following steps. In step S510, an LSB and a surplus pixel bit are acquired from each pixel of the pixel block, and the LSB and the surplus pixel bit are output. Each pixel brings a data enabling signal De to indicate that count values (e.g., the horizontal-count-value HC and the vertical-count-value VC) are generated. In step S520, whether the display apparatus is in a 3D display mode or in a 2D display mode is determined.

If the display apparatus is determined to be in the 2D display mode according to the mode-switching signal in step S520, the vertical-count-value is directly output in step S540, i.e., each row of pixels is counted. If the display apparatus is determined to be in the 3D display mode according to the mode-switching signal in step S520, the vertical-count-value is adjusted to be generated by counting every two rows of pixels in step S530, i.e., the vertical-count-value may be divided by two.

In step S550, the arrangement of the dither matrix shown in FIG. 3 is searched according to the LSB, the frame-count-value, the horizontal-count-value, and the vertical-count-value, so as to acquire and output the corresponding carry value. In step S560, the received carry value (e.g., 0 or 1) and the surplus pixel bit are added together, and a display data bit is output.

In light of the foregoing, the image processing apparatus and the image processing method described in the embodiments of the invention have at least the following advantages:

The issue of 3D display image flickers or apparent patterns arisen from different arrangements of a dither matrix corresponding to the left and right eyes can be resolved.

The arrangement of the dither matrix applied to the display apparatus in the 2D display mode is also applicable to the display apparatus in the 3D display mode. Hence, it is not necessary to expand the memory capacity, and the circuit costs can be significantly lowered down.

The image processing method described in the embodiments of the invention can be applied to the display panels with various dimensions.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image processing method for adjusting a gray level of a pixel block of a display apparatus, an image being displayed on the pixel block by switching a plurality of frames, the image processing method comprising:

acquiring a least significant bit and a surplus pixel bit from each pixel of the pixel block, wherein the surplus pixel bit is the bit in each pixel other than the least significant bit;

determining whether the display apparatus is in a three-dimensional display mode or in a two-dimensional display mode according to a mode-switching signal;

if the display apparatus is in the three-dimensional display mode, adjusting a way to generate a vertical-count-value by counting every two rows of pixels, wherein the least significant bit indicates a dither matrix group corresponding to the pixel block, and the vertical-count-value indicates a carry value of the dither matrix group corresponding to each row of pixels of the pixel block, wherein the vertical-count-value is a positive integer, the vertical-count-value corresponds to a position of the pixel block where the surplus pixel bit is generated from;

outputting the carry value corresponding to the vertical-count-value; and adding the carry value of the dither matrix group corresponding to the vertical-count-value to the surplus pixel bit corresponding to the vertical-count-value.

2. The image processing method as recited in claim 1, wherein the step of outputting the carry value corresponding to the vertical-count-value comprises:

outputting the carry value of the dither matrix group corresponding to each pixel according to a horizontal-count-value and a frame-count-value, wherein the horizontal-count-value indicates the carry value of the dither matrix group corresponding to each column of pixels of the pixel block, and the frame-count-value indicates a dither matrix of the dither matrix group corresponding to the pixel block.

3. The image processing method as recited in claim 1, wherein the vertical-count-value is generated by counting each row of pixels if the display apparatus is in the two-dimensional display mode.

4. The image processing method as recited in claim 1, wherein the frames comprise a first frame, a second frame, a third frame, and a fourth frame, and the frames start to be sequentially switched from one of the first, second, third, and fourth frames.

5. The image processing method as recited in claim 4, wherein the frames start to be sequentially switched from the first frame, a way to carry each pixel of the pixel block in a (4N+1) frame of the frames is identical to a way to carry each pixel of the pixel block in the first frame, a way to carry each pixel of the pixel block in a (4N+2) frame of the frames is identical to a way to carry each pixel of the pixel block in the second frame, a way to carry each pixel of the pixel block in a (4N+3) frame of the frames is identical to a way to carry each pixel of the pixel block in the third frame, a way to carry each pixel of the pixel block in a (4N+4) frame of the frames is identical to a way to carry each pixel of the pixel block in the fourth frame, and N is a positive integer.

6. An image processing apparatus for adjusting a gray level of a pixel block of a display apparatus, an image being displayed on the pixel block by switching a plurality of frames, the image processing apparatus comprising:

a pixel block processing unit acquiring a least significant bit and a surplus pixel bit from each pixel of the pixel block, wherein the surplus pixel bit is the bit in each pixel other than the least significant bit;

a counting unit generating a vertical-count-value according to the pixel block;

a mode-switching unit coupled to the counting unit and determining whether the display apparatus is in a three-dimensional display mode or in a two-dimensional display mode according to a mode-switching signal, wherein if the display apparatus is in the three-dimensional display mode, the mode-switching unit adjusts a way to generate a vertical-count-value by counting every two rows of pixels and outputs the adjusted vertical-count-value, the least significant bit indicates a dither matrix group corresponding to the pixel block, and the vertical-count-value indicates a carry value of the dither matrix group corresponding to each row of pixels of the pixel block, wherein the vertical-count-value is a positive integer, the vertical-count-value corresponds to a position of the pixel block where the surplus pixel bit is generated from;

a dither unit coupled to the pixel block processing unit, the counting unit, and the mode-switching unit, the dither unit outputting a carry value corresponding to the adjusted vertical-count-value; and an adding unit coupled to the pixel block processing unit and the dither unit, the adding unit adding the carry value of the dither matrix group corresponding to the vertical-count-value to the surplus pixel bit corresponding to the vertical-count-value.

7. The image processing apparatus as recited in claim 6, wherein the counting unit further generates a horizontal-count-value and a frame-count-value according to the pixel block, the dither unit further outputs the carry value of the dither matrix group corresponding to each pixel according to the horizontal-count-value and the frame-count-value, the horizontal-count-value indicates the carry value of the dither matrix group corresponding to each column of pixels of the pixel block, and the frame-count-value indicates a dither matrix of the dither matrix group corresponding to the pixel block.

8. The image processing apparatus as recited in claim 6, wherein the vertical-count-value is generated by counting each row of pixels if the display apparatus is in the two-dimensional display mode.

9. The image processing apparatus as recited in claim 6, wherein the frames comprise a first frame, a second frame, a third frame, and a fourth frame, and the frames start to be sequentially switched from one of the first, second, third, and fourth frames.

10. The image processing apparatus as recited in claim 9, wherein the frames start to be sequentially switched from the first frame, a way to carry each pixel of the pixel block in a (4N+1) frame of the frames is identical to a way to carry each pixel of the pixel block in the first frame, a way to carry each pixel of the pixel block in a (4N+2) frame of the frames is identical to a way to carry each pixel of the pixel block in the second frame, a way to carry each pixel of the pixel block in a (4N+3) frame of the frames is identical to a way to carry each pixel of the pixel block in the third frame, a way to carry each pixel of the pixel block in a (4N+4) frame of the frames is identical to a way to carry each pixel of the pixel block in the fourth frame, and N is a positive integer.

11. The image processing apparatus as recited in claim 6, wherein the mode-switching unit comprises:

a shift register coupled to the counting unit and dividing the vertical-count-value by two; and a multiplexer, wherein a first input end and a second input end of the multiplexer are respectively coupled to the counting unit and the shift register, a selecting end of the multiplexer receives the mode-switching signal, and the selecting end selects to output the vertical-count-value or the vertical-count-value divided by two according to the mode-switching signal.

* * * * *

UNITED STATES PATENT AND TRADEMARK OFFICE
CERTIFICATE OF CORRECTION

PATENT NO. : 8,913,077 B2  
APPLICATION NO. : 13/421875  
DATED : December 16, 2014  
INVENTOR(S) : Yu-Hung Li and Chien-Hung Chen Page 1 of 1

It is certified that error appears in the above-identified patent and that said Letters Patent is hereby corrected as shown below:

On the title page item (73) Assignee's Name
"Chunghwa Picture Tubee, Ltd." should be changed to --Chunghwa Picture Tubes, Ltd.--.

Signed and Sealed this
Thirty-first Day of March, 2015

Michelle K. Lee
*Director of the United States Patent and Trademark Office*